UNITED STATES PATENT OFFICE.

LOUIS GOPPMAN, OF PITTSBURG, PENNSYLVANIA.

SOLDER FOR ALUMINUM.

939,494. Specification of Letters Patent. Patented Nov. 9, 1909.

No Drawing. Application filed July 26, 1909. Serial No. 509,543.

*To all whom it may concern:*

Be it known that I, LOUIS GOPPMAN, a subject of the Czar of Russia, and residing in the city of Pittsburg, in the county of Allegheny and State of Pennsylvania, have invented or discovered new and useful Improvements in Solder for Aluminum, of which the following is a specification.

My invention consists in a new and improved soldering compound for use in soldering aluminum and for similar purposes.

Hitherto the art of working aluminum has been greatly retarded in its development by the lack of an efficient solder and the use of the metal has been, generally speaking, confined to the manufacture of articles which can be made integrally of a single piece of metal or of a plurality of pieces riveted together. Owing to its lightness, durability and non-corrosive properties the field of usefulness of aluminum would be greatly broadened by the introduction of an efficient solder.

My solder enables a plurality of pieces of aluminum to be united together or a piece of aluminum to be united to another metal with so strong a bond that the soldered union is stronger and more durable than the aluminum itself.

My solder is composed of tin; antimony; lead; zinc, and copper, which elements I prefer to use in substantially:—the following proportions, viz:—tin, 49.05 per cent.; antimony, 3.43 per cent.; lead, 26.06 per cent.; zinc, 20.31 per cent., and copper, 1.10 per cent. The elements are thoroughly mingled together in a melted state and allowed to harden in the form of sticks or bars of a convenient size and shape for handling.

When metal surfaces are to be united with my solder, I first rub the surfaces with rosin and then apply my solder with a soldering iron, and the result is a union between the metal pieces which is more strong and durable than the metal itself.

What I desire to claim is:—

1. A compound for soldering aluminum composed of tin, antimony, lead, zinc, and copper.

2. The herein described solder for aluminum consisting of a composition of substantially the following proportions, tin, 49.05%; antimony, 3.43%; lead, 26.06%; zinc, 20.31%; and copper, 1.10%, for the purposes described.

Signed at Pittsburg, Pa., this 24th day of July, 1909.

LOUIS GOPPMAN.

Witnesses:
E. A. LAWRENCE,
T. CHALMERS DUFF.